US008292132B2

(12) United States Patent
Behar et al.

(10) Patent No.: US 8,292,132 B2

(45) Date of Patent: Oct. 23, 2012

(54) FLUID DISPENSER

(75) Inventors: Alain Behar, Suresnes (FR); Gerard Cornet, Blaru (FR); Francis Moreau, Sotteville les Rouen (FR)

(73) Assignee: Aptar France SAS, Le Neubourg (FR)

( * ) Notice: Subject to any disclaimer, the term of this patent is extended or adjusted under 35 U.S.C. 154(b) by 806 days.

(21) Appl. No.: 12/332,839

(22) Filed: Dec. 11, 2008

(65) Prior Publication Data

US 2009/0152303 A1 Jun. 18, 2009

Related U.S. Application Data

(60) Provisional application No. 61/033,600, filed on Mar. 4, 2008.

(30) Foreign Application Priority Data

Dec. 12, 2007 (FR) ..................................... 07.59773

(51) Int. Cl.
*G01F 11/00* (2006.01)

(52) U.S. Cl. .................................. 222/321.7; 222/153.1

(58) Field of Classification Search .... 222/321.7–321.9, 222/383.1, 383.3, 153.09, 153.1; 220/324, 220/326, 319; 215/224, 225, 274, 280
See application file for complete search history.

(56) References Cited

U.S. PATENT DOCUMENTS

| | | | | |
|---|---|---|---|---|
| 34,976 | A * | 4/1862 | Nicholson | 215/274 |
| 2,576,580 | A * | 11/1951 | Edwards | 215/272 |
| 4,773,553 | A * | 9/1988 | Van Brocklin | 215/272 |
| 5,779,072 | A * | 7/1998 | Krebs | 215/219 |
| 6,394,318 | B1 | 5/2002 | Klodzinski | |
| 6,409,049 | B1 * | 6/2002 | de Pous et al. | 222/153.09 |

FOREIGN PATENT DOCUMENTS

| | | |
|---|---|---|
| EP | 0 208 390 A1 | 1/1987 |
| EP | 0 704 250 A2 | 4/1996 |
| FR | 2 790 743 A1 | 9/2000 |
| GB | 910686 | 11/1962 |
| GB | 1 590 267 | 5/1981 |

* cited by examiner

*Primary Examiner* — Kevin P Shaver
*Assistant Examiner* — Donnell Long
(74) *Attorney, Agent, or Firm* — Sughrue Mion, PLLC

(57) ABSTRACT

A fluid dispenser comprising:
- a fluid reservoir (1) having a neck (11) defining an opening (10) and an axis X, the neck (11) projecting axially from a shoulder (13); and
- a dispenser unit (D) comprising a dispenser member (4), such as a pump or a valve, and a fastener system (2, 31) for fastening the dispenser member (4) on the neck (11) of the reservoir (1), the fastener system comprising a fastener ring (2) that is engaged with the neck (11) and a blocking hoop (31) that is engaged axially around the ring (2) for blocking the ring on the neck in the final assembled position;
- disassembly means (14, 34) for axially moving the hoop (31) relative to the ring (2), from the final assembled position to a disassembled position in which the hoop does not block the ring on the neck, such that the unit (D) can be removed from the neck (11), the disassembly means comprising two elements (14, 34) capable of turning mutually relative to each other about the axis X, the dispenser being characterized in that one element (14) of the disassembly means is secured to the reservoir, while an other element (34) is secured to the dispenser unit (D).

17 Claims, 3 Drawing Sheets

FLUID DISPENSER

CROSS REFERENCE TO RELATED APPLICATION

This application claims the benefit under 35 U.S.C. §119 (e) of U.S. provisional patent application Ser. No. 61/033,600, filed Mar. 4, 2008, and priority under 35 U.S.C. §119 (a)-(d) of French patent application No. FR-07.59773, filed Dec. 12, 2007.

TECHNICAL FIELD

The present invention relates to a fluid dispenser comprising a fluid reservoir having a neck defining an opening and an axis X, the neck projecting axially from a shoulder. The dispenser also comprises a dispenser unit comprising a dispenser member, such as a pump or a valve, and a fastener system for fastening the dispenser member on the neck of the reservoir, the fastener system comprising a fastener ring that is engaged with the neck and a blocking hoop that is engaged axially around the ring for blocking the ring on the neck in the final assembled position. Advantageous fields of application of the present invention are the fields of perfumery, cosmetics, or even pharmacy.

BACKGROUND OF THE INVENTION

This type of fastener system using a fastener ring associated with a blocking hoop is already known in the prior art. In general, the fastener ring includes reception means, e.g. a housing, making it possible to receive the dispenser member that can, for example, include a projecting collar for engaging by snap-fastening in the housing of the ring. In addition to the reception means, the fastener ring also includes a fastener skirt of substantially cylindrical shape defining an inside wall that is provided with one or more fastener profiles for coming into engagement with the neck of the reservoir. Conventionally, the neck of the reservoir forms a projecting annular outer reinforcement below which the fastener profile(s) are engaged in the final assembled position. The function of the blocking hoop is to prevent the inner profile(s) of the skirt of the ring from becoming disengaged from below the projecting outer reinforcement of the neck. In other words, the blocking hoop holds the fastener profile(s) of the ring captive against the neck of the reservoir. To enable the profile(s) to pass beyond and below the projecting annular reinforcement of the neck, it is possible to make the skirt of the ring with longitudinal slots so as to divide the skirt into a plurality of tabs that are separated by slots. In a variant, it is possible to leave the skirt continuous, and to take advantage of the elasticity and the deformability of the skirt in order to enable the fastener profile(s) to pass over the projecting annular reinforcement of the neck. Either way, it is necessary for the skirt of the ring to be able to deform radially outwards while passing over the reinforcement of the neck. The function of the blocking hoop is to prevent the skirt of the ring from deforming radially outwards once the fastener profile(s) is/are engaged below the reinforcement of the neck.

In general, the final assembled position in which the blocking hoop prevents the ring for becoming disengaged from the neck is a permanent position, in the sense that it is no longer possible to remove the blocking hoop from the ring so as to enable the ring to be removed from the neck. Consequently, in order to remove a dispenser unit using such a fastener system, it is necessary to destroy the hoop, the ring, or the neck. The hoop is held on strongly, such that its resistance to traction cannot be overcome by axially pulling on the hoop, without damaging or destroying it.

However, in some circumstances, it can turn out to be useful to disassemble the dispenser, i.e. to remove the dispenser unit from the reservoir. When the reservoir is for refilling once it has been emptied, a screw-fastener system is generally used. The ring and blocking-hoop fastener system turns out to be not very suitable, given that the hoop is put into place on the ring in permanent manner. Disassembly can also turn out to be useful in order to recycle the dispenser by separating the various component materials. In theory, this is possible with the ring and blocking-hoop fastener system, but that requires one of the ring, the hoop, or the neck to be destroyed, which operation is random and therefore difficult to industrialize.

BRIEF SUMMARY OF THE INVENTION

An object of the present invention is to extend the range of suitability of the ring and blocking-hoop fastener system to applications in which it is necessary to remove the dispenser unit from the reservoir. Another object of the present invention is to make disassembly possible, without adding additional pieces to the dispenser. Manufacture, implementation, and assembly that are simple and low cost are also objects of the present invention.

To achieve these objects, the present invention proposes A fluid dispenser comprising a fluid reservoir having a neck defining an opening and an axis X, the neck projecting axially from a shoulder, a dispenser unit comprising a dispenser member, such as a pump or a valve, and a fastener system for fastening the dispenser member on the neck of the reservoir, the fastener system comprising a fastener ring that is engaged with the neck and a blocking hoop that is engaged axially around the ring for blocking the ring on the neck in the final assembled position, disassembly means for axially moving the hoop relative to the ring, from the final assembled position to a disassembled position in which the hoop does not block the ring on the neck, such that the unit can be removed from the neck, the disassembly means comprising two elements capable of turning mutually relative to each other about the axis X, the dispenser being characterized in that one element of the disassembly means is secured to the reservoir, while an other element is secured to the dispenser unit. The present invention thus avoids partial or total destruction of the hoop, the ring, or the neck of the reservoir.

In an advantageous aspect of the invention, the other element is integral with the hoop. Thus, turning the hoop relative to the reservoir is transformed into axial movement of the hoop relative to the reservoir. It is advantageous to act directly on the hoop which tightly surrounds the ring, thus avoiding any plastic or elastical deformation of the fastener system. Upon axial pushing from beneath on the hoop, its moving relative to the ring is achieved.

In a practical embodiment, the disassembly means comprise at least one ramp and a cam, the cam coming into sliding contact on the ramp during turning of the cam relative to the ramp, thereby inducing relative axial movement. The cam is advantageously formed at a bottom end of the hoop. The bottom end of the hoop advantageously presents an irregular profile defining different axial heights that correspond substantially to the heights of the ramp. At least one ramp is advantageously formed by the reservoir around the neck, projecting axially from the shoulder. Thus, it is turning the hoop (and the dispenser unit as a whole) relative to the reservoir that enables the hoop to be moved axially (without the remainder of the elements of the dispenser unit) by means of a force transformation system, formed by the disassembly means, that may be a combination of a ramp formed by the reservoir and a cam formed by the hoop. In concrete terms, it suffices to turn the dispenser unit relative to the reservoir in order to cause the hoop to be axially moved simultaneously relative to the ring, thereby disengaging it from the neck. The dispenser unit can then be removed from the neck.

In another advantageous aspect of the invention, the hoop is surrounded by an outer skirt that masks both the hoop and the disassembly means in the final assembled position. The outer skirt may serve as an outer covering for the dispenser unit, imparting an attractive appearance thereto. However, it is possible to use the outer skirt to impart the turning movement required to move the blocking hoop relative to the ring.

According to another advantageous characteristic of the invention, intermediate clearance is provided between the hoop and the ring in the disassembled position and/or in the pre-assembled position, so as to enable the ring to move radially outwards while it is being disassembled from and/or assembled to the neck. This characteristic, which may be protected independently of the disassembly means of the invention, makes it possible to elongate or extend the hoop, thereby enabling the hoop to reach quickly the shoulder of the reservoir where the ramp is advantageously formed, without the blocking function being provided by the entire height of the hoop. Thus, it suffices to move the hoop axially over a very limited height in order to unblock the ring from the neck. This avoids moving the bottom end of the hoop relative to the ring to above the inner fastener profile(s). The extension of the hoop forming the intermediate clearance does not enable the ring to be blocked on the neck, but, in contrast, serves as an axial-thrust transmission element while the hoop is turning on the neck. The non-blocking extension of the hoop also enables the ring to be pre-assembled inside the hoop before the dispenser unit is assembled for the first time on the reservoir neck, and without the ring projecting out from the hoop. The fastener ring, which is a fragile element since it is deformable, is thus protected inside the hoop in which it is completely inscribed. It should be clearly understood that this last characteristic (the ring protected in the hoop) may be implemented independently of the disassembly means of the present invention.

The spirit of the invention is to make it possible to disassemble a conventional fastener system that is known for being unsuitable for disassembly. Given that the resistance to traction on the hoop is considerable when in the final assembled position, an advantageous solution of the present invention proposes not pulling directly on the hoop axially, but instead turning the hoop and using a system for transforming force direction to transform a rotary movement into axial movement.

BRIEF DESCRIPTION OF THE DRAWINGS

The invention is described more fully below with reference to the accompanying drawings which show an embodiment of the invention by way of non-limiting example. In the figures.

DETAILED DESCRIPTION OF THE INVENTION

Figure 1:
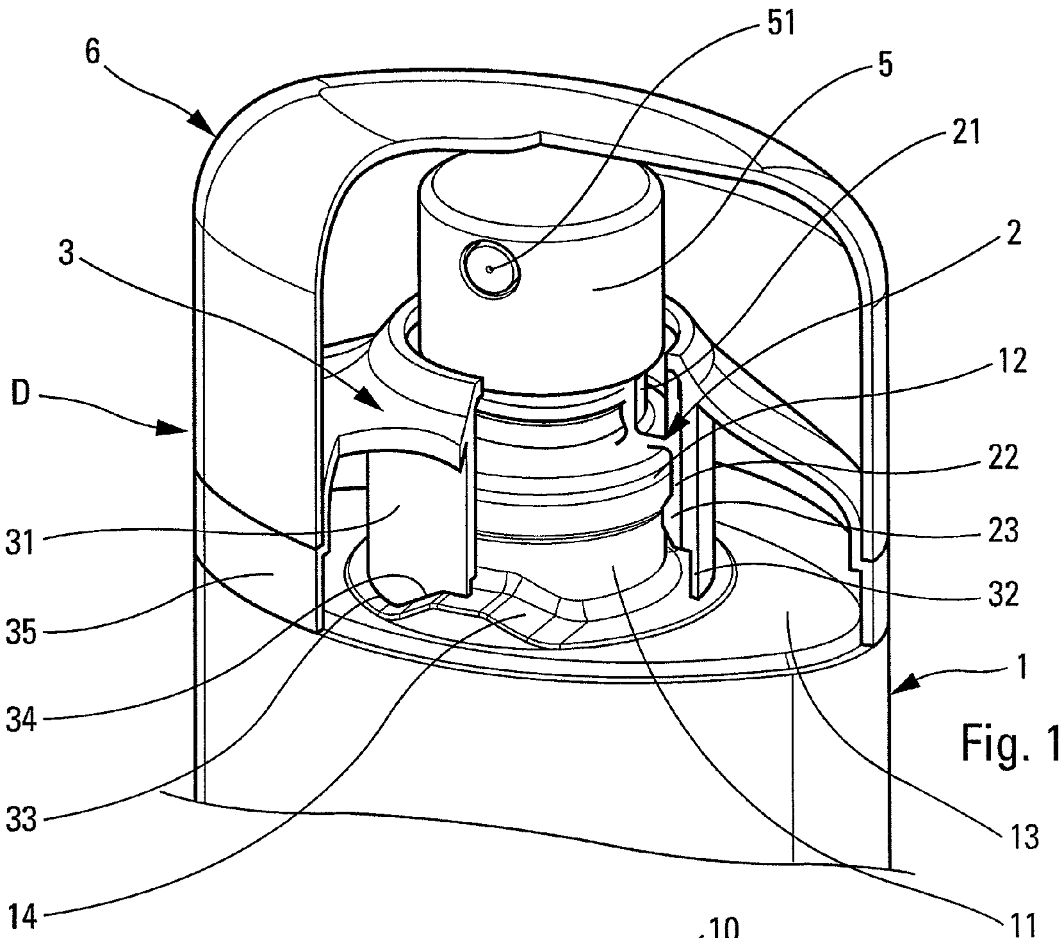
FIG. 1 is a partially cut-away perspective view of a fluid dispenser of the invention in its final assembled position.
Figure 2:
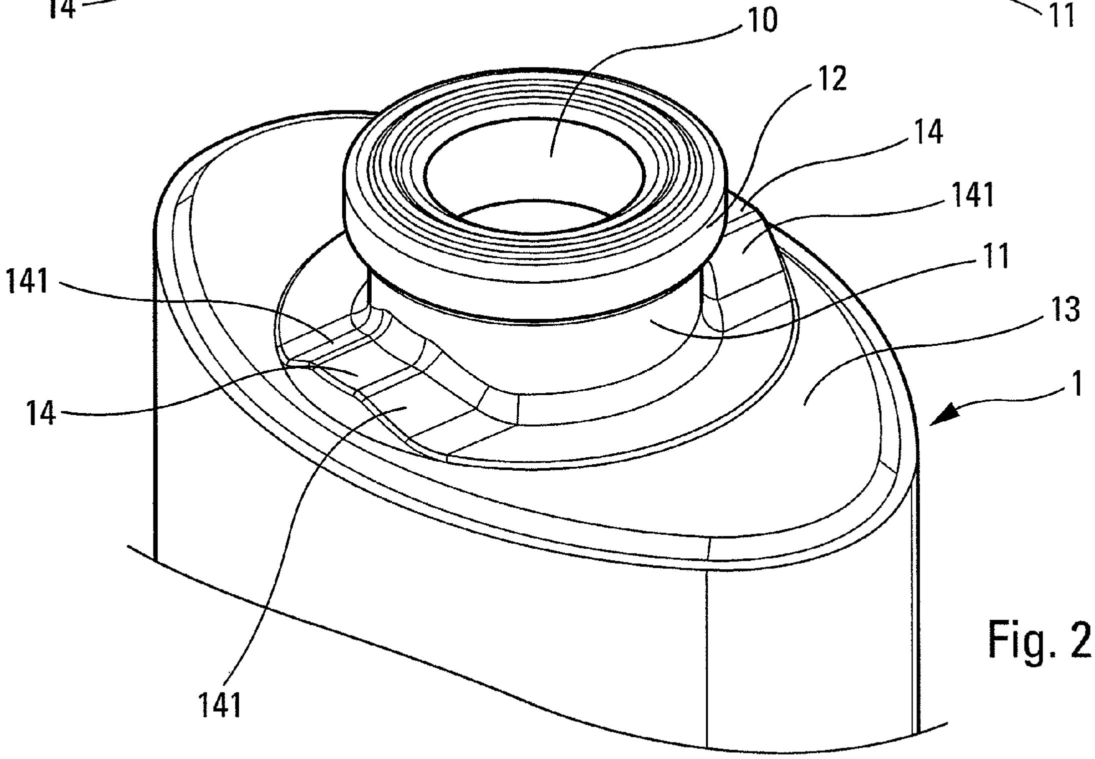
FIG. 2 is a perspective view of the top portion of a fluid reservoir of the present invention.

Reference is made initially to FIGS. 1 and 2 in order to describe in detail a fluid dispenser constituting a non-limiting embodiment of the present invention in its final assembled position. The dispenser comprises a plurality of component elements, namely: a fluid reservoir 1, a fastener ring 2, a blocking and covering piece 3, a dispenser member 4 (not shown in FIG. 1), a pusher 5, and a protective cap 6. The dispenser member 4 can be a pump or a valve. The protective cap can be optional.

The reservoir 1 can be made of any appropriate material, e.g. glass, plastics material, metal, etc. In its top portion, the reservoir 1 defines a shoulder 13 from which there projects a neck 11 defining an opening 10 that puts the inside of the reservoir into communication with the outside. The neck 11 is made with a reinforcement or annular flange 12 that projects radially outwards. The reinforcement 12 thus forms a bottom rim that serves as a fastener surface for the dispenser unit, as described below. This design is entirely conventional for a fluid reservoir in the fields of cosmetics, perfumery, or even pharmacy.

In the invention, the reservoir is further provided with two ramps 14 that project from the shoulder 13, and that are disposed in diametrally opposite manner relative to the neck 11. In the embodiment shown in the figures, there are two ramps 14, but it is possible to provide only a single ramp, or alternatively more than two ramps, The ramps 14 are thus disposed around the neck 11 and they are connected thereto. Each ramp 14 defines two slopes 141 of identical inclination and of opposite orientation. It is also possible to provide only one slope 141, or even two slopes, but of different inclinations. This is merely an embodiment detail. Naturally, the ramps 14 are made integrally with the reservoir 1. However, in a variant, it is possible that the ramps 14 are formed by a separate piece, that is then fitted around the neck 11. By way of example, the piece could be in the form of a ring or a washer forming one or more ramps, the ring being engaged around the neck 11 and fastened securely into place on the shoulder 13. The function of the ramps 14 is described below, The piece 3, the dispenser member 4, the pusher 5, and the cap 6 form a dispenser unit D that is pre-assembled before being mounted on the reservoir. The dispenser member 4, the pusher 5, and the cap 6 are not critical elements for the present invention, and they are therefore not described in detail. These elements are not directly involved in the present invention, which relates more particularly to the fastener system formed by the fastener ring 2 and a portion of the piece 3.

The fastener ring 2 is of a design that is entirely conventionally for a conventional fastener system that implements a fastener ring that is blocked on the neck of a reservoir by means of a blocking hoop. The ring 2 thus includes reception means 21 for receiving, in stationary manner, the dispenser member 4 (not shown in FIG. 1, but shown in FIGS. 3*a* and 4). By way of example, the reception means 21 can be in the form of a snap-fastener housing in which a projecting collar of the body of the dispenser member is snap fastened. The particular shape of the reception means 21 is not critical for the present invention. The fastener ring 2 also includes a fastener skirt 22 having an outside shape that is substantially or completely cylindrical. The fastener skirt 22 internally forms one or more fastener profiles 23 that project radially inwards. By way of example, the fastener profile 23 can extend in continuous manner over the entire inner periphery of the skirt 22. In a variant, a plurality of profiles 23 can be distributed over the inner periphery of the skirt 22. The skirt 22 can be continuous so as to form a solid cylinder, or, in a variant, the skirt can be formed with slots that divide the skirt into a plurality of tabs, each formed with one or more fastener profiles 23. The fastener profiles 23 can be preformed on the inside surface of the skirt. In a variant, the fastener profiles can come from the skirt being plastically deformed inwards below the reinforcement of the neck: this deformation can be achieved by means of the blocking hoop. Whatever the configuration of the skirt 22 (and of its fastener profiles 23), it is radially deformable, so as to enable the fastener profiles 23 to be housed below the rim formed by the projecting reinforcement 12 of the neck 11, as can be seen in FIG. 1. To achieve this position, which can be said to be "snap-fastening", it is naturally necessary for the profiles 23 to pass over and beyond the reinforcement 12. For preformed inner profiles, it is necessary for the skirt 22 to deform radially outwards while passing over the reinforcement 12, so as then to be able to retract once again so that the profiles come into snap-fastened engagement below the rim 12. However, given the deformability of the skirt 12, secure fastening thereof below the reinforcement 12 cannot be guaranteed solely by the ring; it further requires a blocking element that prevents the skirt of the ring from deforming radially outwards once again, and thereby disengaging its fastener profiles 23 from below the reinforcement 12. For profiles obtained by plastic deformation, the skirt can be engaged around the neck without any deformation. However, the hoop is then lowered onto the skirt and deforms it radially inwards below the reinforcement of the neck, thereby forming fastener profiles.

In the embodiment described herein, the blocking element is formed by a blocking hoop 31 that forms an integral part of the piece 3. This is only one particular non-limiting embodiment: the blocking hoop 31 could very well be made in separate and individual manner. The blocking hoop 31 is in the form of a substantially cylindrical segment that is engaged around the ring 2, and more precisely around the fastener skirt 22. The blocking hoop 31 can extend above the ring 2 by forming an inner rim that comes to bear on the top end of the ring. The inside surface of the hoop 31 comes into clamping engagement with the outside surface of the ring 2 in such a manner as to provide an assembly that is suitable for withstanding a predetermined traction force. It is even possible to provide special means that make it possible to increase the retention of the hoop on the ring. With reference to FIG. 1, it can be seen that the hoop 31 includes a bottom end edge 33 that comes into contact with the reservoir 1, more particularly at its shoulder 13. It should also be observed that the edge 33 comes into contact with the ramps 14 of the reservoir. Because of this, the edge 33 presents an irregular profile, given that it coarsly, substantially, or completely follows the profile of the ramps 14. The profile of the edge 33 thus defines different axial heights given that the edge comes directly into contact with the shoulder 13 or with the ramps 14. At the ramps 14, it can be said that the edge 33 of the hoop 31 is indented or raised. In the invention, at the ramps 14, the edge 33 defines cams 34 for coming into sliding contact with the slopes 141 of the ramps 14. The effect of turning the hoop 31 relative to the reservoir 1 is described below. In addition, the blocking hoop 31 also defines an extension section 32 that forms the bottom end portion of the hoop 31, and as a result the bottom end edge 33. The extension section 32 presents the distinctive feature of its inside surface being offset radially outwards relative to the inside surface of the remainder of the hoop in contact with the ring. It can also be said that the extension section 32 presents an inside surface that is radially offset in such a manner as to form a recess or a step relative to the remainder of the hoop. In the final assembled position as shown in FIG. 1, the extension section 32 is disposed below the bottom end of the ring 2, and, as a result, does not co-operates at all with the ring. The purpose of the offset extension section 32 in the context of the present invention is described below.

With regard to the other component elements of the dispenser unit D, it should be observed that the blocking hoop 31 is made integrally with an outer covering skirt 35 on which the protective cap 6 is mounted. As mentioned above, it is also possible to make the covering skirt 35 separately from the covering hoop 31. The dispenser member 4, that is visible only in FIGS. 3*a* and 4, can be a pump or a valve including a body forming a collar that is received in stationary manner in the reception means 21 of the ring 2. Naturally, the dispenser member includes an actuator rod on which there is mounted the pusher 5 that can advantageously be formed with a dispenser orifice 51. By pressing axially on the pusher 51, fluid is dispensed in optionally metered form through the dispenser orifice 51.

Figure 3C:
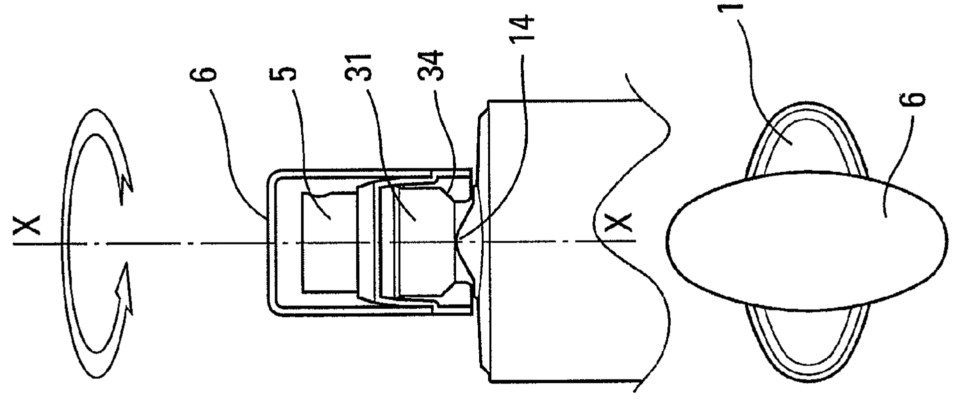
FIGS. 3*a*, 3*b*, and 3*c* are diagrammatic views demonstrating the assembly and disassembly operations of a fluid dispenser of the invention.
Figure 3B:
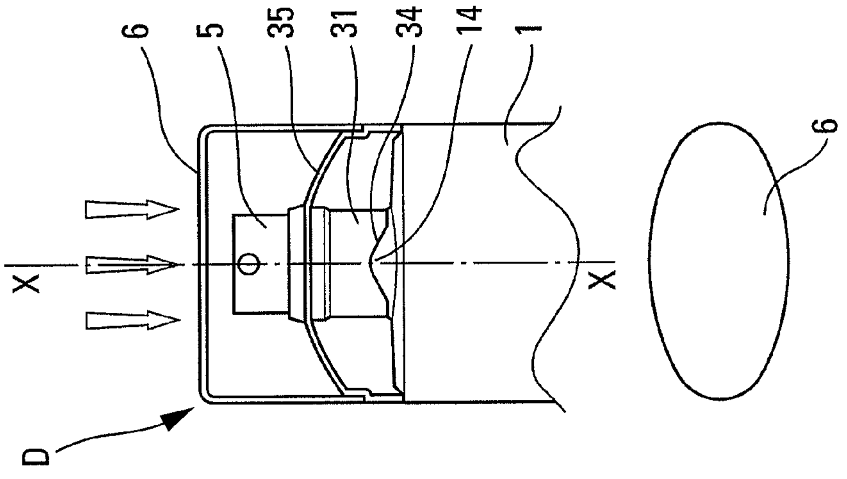
Figure 3A:
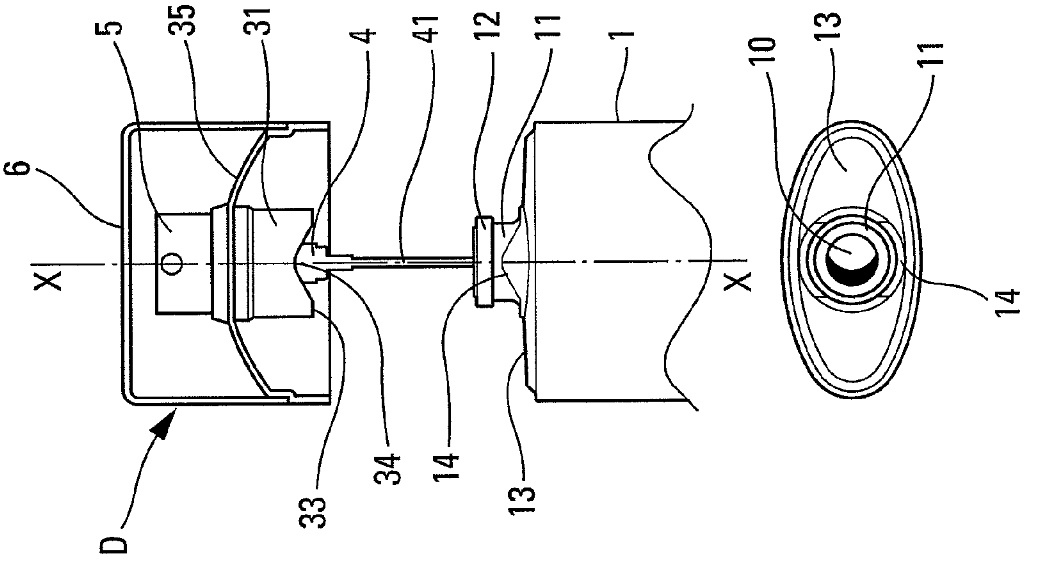
Figure 4:
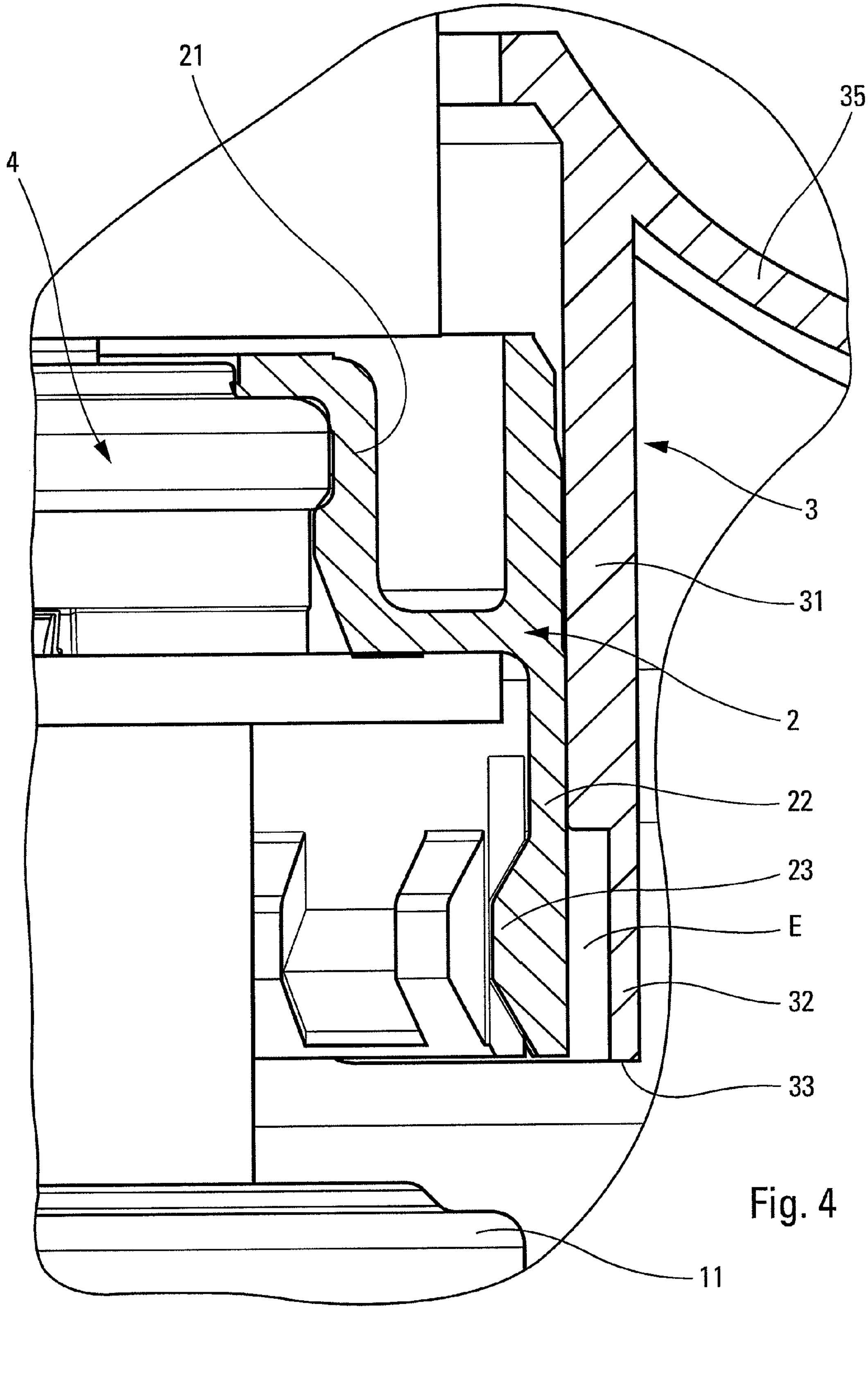
FIG. 4 is a greatly enlarged section view of a portion of a fluid dispenser of the invention in its disassembled and/or pre-assembled position.

Reference is made below to FIGS. 3*a*, 3*b*, and 3*c* in order to describe in detailed manner operations for assembling and for disassembling the dispenser unit D.

In FIG. 3*a*, the dispenser unit D is ready to be mounted on the reservoir 1. The unit D is brought in axial manner along the axis X, onto the reservoir 1. The dispenser member 4 can be provided with a dip tube 41 that is inserted initially into the opening 10 of the neck 11.

In FIG. 3*b*, the unit D has been assembled by applying an axial thrust force (represented by the three arrows) on the unit D. In conventional manner, the fastener ring 2 is engaged initially around the neck 11 of the reservoir, then the blocking hoop 31 is lowered around the fastener profiles 23 of the ring so as to block them below the reinforcement 12 of the neck. To do this, the blocking hoop 31 is pre-assembled on the ring 2, but in such a manner that the hoop does not prevent the fastener profiles 23 from deforming radially outwards, so as to allow them to pass over the reinforcement 12. This pre-assembled position is shown in very greatly enlarged manner in FIG. 4. It can be seen that the dispenser member 4 is in place in the reception means 21, but that the blocking hoop 31 is in a provisional pre-assembled position that is not final. The inside surface of the hoop 31 is not in clamping contact with the outside surface of the skirt 22 at the fastener profiles 23. In contrast, the bottom edge 33 of the hoop 31 extends down to the bottom end of the skirt 22, or very slightly below it. In reality, it is the extension section 32 that is disposed level with the fastener profiles 23, but this section 32 does not come into contact with the skirt 22, since it is offset radially outwards. Intermediate clearance E is created in this way between the ring 22 and the extension section 32. The clearance E enables the skirt 22 to deform radially outwards while the profiles 23 are passing over the reinforcement 12. Thus, in the pre-assembled position shown in FIG. 4, the dispenser unit D can be assembled on the neck of a reservoir by engaging the profiles 23 initially below the reinforcement 12, then by lowering the blocking hoop 31 in such a manner as to bring the hoop 31 into clamping contact with the ring 22 level with the fastener profiles 23, and finally by offsetting the extension section 32 downwards. This is visible in FIG. 1. Given that the reservoir 1 is formed with two ramps 14, it is necessary to orientate the hoop 31 while the unit is being assembled on the reservoir, so as to bring the cams 34 into contact with the slopes 141 of the ramps 14. However, it is not necessary for the orientation to be very accurate, since the hoop 31 adjusts its position correctly as soon as the indents in the edge 33 come coarsely into alignment with the ramps 14. In the final assembled position, the ramps 14 and the blocking hoop 31 are not even visible, given that they are masked by the outer covering skirt 35. The user can then use the dispenser in conventional manner, initially by removing the cap 6 and then by pressing on the pusher 5.

By means of the invention, it is possible to disassemble the dispenser by removing the dispenser unit D from the reservoir 1. To do this, it suffices to turn the blocking hoop 31 relative to the neck 1. This can be performed by turning the covering skirt 35 or the cap 6, as shown in FIG. 3*c*. The relative turning between the blocking hoop 31 and the reservoir 1 causes the bottom edge 33 of the hoop 31 to be moved over the ramps 14 formed by the reservoir 1. More precisely, the cams 34 of the hoop 31 slide over the slopes 141 of the ramps 14, thereby causing the hoop 31 to be moved axially upwards relative to the ring 2. The cams 34, associated with the ramps 14, thus constitute disassembly means that make it possible to unblock the ring 22 from its engagement below the reinforcement 12. To do this, it suffices to move the hoop 31 over an axial distance, once again enabling the ring 22 to deform radially outwards so as to enable the fastener profiles 23 to pass over the reinforcement 12. The dispenser unit is then in a disassembled position that can be identical to the pre-assembled provisional position shown in FIG. 4. The hoop 31 has been moved in such a manner as to bring the extension section 32 into register with the fastener profiles 23. The clearance E is once again formed between the skirt 22 and the hoop 31. Because of the extension section 32, it is not necessary to move the bottom edge 33 of the hoop above the fastener profiles 23. On the contrary, the bottom edge 33 of the hoop can merely be put back into register with the bottom edge of the ring. Without the extension section 32, it would be necessary to provide ramps 14 with a special profile enabling the hoop 31 to be raised above the fastener profiles 23. This is not practical, even though it is not impossible in the context of the present invention. The extension section 32 advantageously enables the hoop to be brought into contact with the ramps 14 without it being necessary to move it over a considerable height, so as to make it possible both to assemble it and to disassemble it. It should not be forgotten that the clearance E exists only in the pre-assembled position and in the disassembled position: in the final assembled position, the clearance E no longer exists, since the extension section 32 is offset axially downwards, below the bottom end of the skirt 22. In this embodiment, the extension section 32 is made in the form of a reduction in the wall thickness of the hoop. It is also possible to make the extension section 32 having wall thickness that is constant, but forming an outwardly-directed shoulder.

Thus, in order to enable the dispenser unit D to be disassembled, it suffices to turn it through an angle of rotation that is relatively small, e.g. in the range 30° to 45° approximately. The height of the ramps 14 should be determined as a function of the height of the fastener profiles 23 and/or of the extension section 32. The bottom end of the ring 2 can even come into contact with the ramps 14.

Preformed fastener profiles have been used as an example to demonstrate the present invention. Alternatively, it is possible to use fastener profiles that are obtained by deforming the skirt radially inwards below the reinforcement of the neck by means of the blocking hoop.

By means of the invention, a conventional fastener system that is known for being unsuitable for disassembly can be disassembled easily and quickly, without complicating the design of the fluid dispenser.

The invention claimed is:

1. A fluid dispenser comprising:

a fluid reservoir having a neck defining an opening and an axis X, the neck projecting axially from a shoulder; and a dispenser unit comprising a dispenser member and a fastener system for fastening the dispenser member on the neck of the reservoir, the fastener system comprising a fastener ring engaged with the neck and a blocking hoop engaged axially around the ring for blocking the ring on the neck in the final assembled position;

disassembly means for axially moving the hoop relative to the ring, from the final assembled position to a disassembled position in which the hoop does not block the ring on the neck, such that the unit can be removed from the neck, the disassembly means comprising two elements capable of turning mutually relative to each other about the axis X;

one of the two elements of the disassembly means is secured to the reservoir, while the other of the two elements is secured to the dispenser unit; and the hoop is surrounded by an outer skirt that masks both the hoop and the disassembly means in the final assembled position.

2. A dispenser according to claim 1, in which the other element is integral with the hoop.

3. A dispenser according to claim 1, in which the neck forms a projecting annular outer reinforcement, the ring including at least one inner fastener profile that is engaged below the outer reinforcement of the neck in the final assembled position.

4. The dispenser according to claim 1, wherein the dispenser member is a pump or a valve.

5. The dispenser according to claim 1, wherein the disassembly means comprises at least one ramp and a cam, the cam coming into sliding contact on the ramp during turning of the cam relative to the ramp, thereby inducing relative axial movement.

6. The dispenser according to claim 5, wherein the cam is formed at a bottom end of the hoop.

7. A dispenser according to claim 6, in which the bottom end of the hoop presents an irregular profile defining different axial heights that correspond substantially to the heights of the ramp.

8. A dispenser according to claim 5, in which at least one ramp is formed by the reservoir around the neck, projecting axially from the shoulder.

9. A fluid dispenser comprising:

a fluid reservoir having a neck defining an opening and an axis X, the neck projecting axially from a shoulder; and a dispenser unit comprising a dispenser member and a fastener system for fastening the dispenser member on the neck of the reservoir, the fastener system comprising a fastener ring engaged with the neck and a blocking hoop engaged axially around the ring for blocking the ring on the neck in the final assembled position;

disassembly means for axially moving the hoop relative to the ring, from the final assembled position to a disassembled position in which the hoop does not block the ring on the neck, such that the unit can be removed from the neck, the disassembly means comprising two elements capable of turning mutually relative to each other about the axis X;

one of the two elements of the disassembly means is secured to the reservoir, while the other of the two elements is secured to the dispenser unit; and intermediate clearance (E) is provided between the hoop (31) and the ring (2) in the disassembled position or in the preassembled position, so as to enable the ring to deform radially outwards while the ring is being disassembled from and/or assembled to the neck.

10. The dispenser according to claim 9, wherein the dispenser member is a pump or a valve.

11. The dispenser according to claim 9, wherein the intermediate clearance is provided between the hoop and the ring in the disassembled position and in the preassembled position, so as to enable the ring to deform radially outwards while the rig is disassembled from or assembled to the neck.

12. The dispenser according to claim 9, wherein the other element is integral with the hoop.

13. The dispenser according to claim 9, wherein the disassembly means comprises at least one ramp and a cam, the cam coming into sliding contact on the ramp during turning of the cam relative to the ramp, thereby inducing relative axial movement.

14. The dispenser according to claim 13, wherein the cam is formed at a bottom end of the hoop.

15. The dispenser according to claim 14, wherein the bottom end of the hoop presents an irregular profile defining different axial heights that correspond substantially to the heights of the ramp.

16. The dispenser according to claim 13, wherein at least one ramp is formed by the reservoir around the neck, projecting axially from the shoulder.

17. The dispenser according to claim 9, wherein the neck forms a projecting annular outer reinforcement, the ring including at least one inner fastener profile that is engaged below the outer reinforcement of the neck in the final assembled position.

* * * * *